PROCESS FOR LUBRICATING POLYMERIC MATERIALS
Filed May 22, 1969
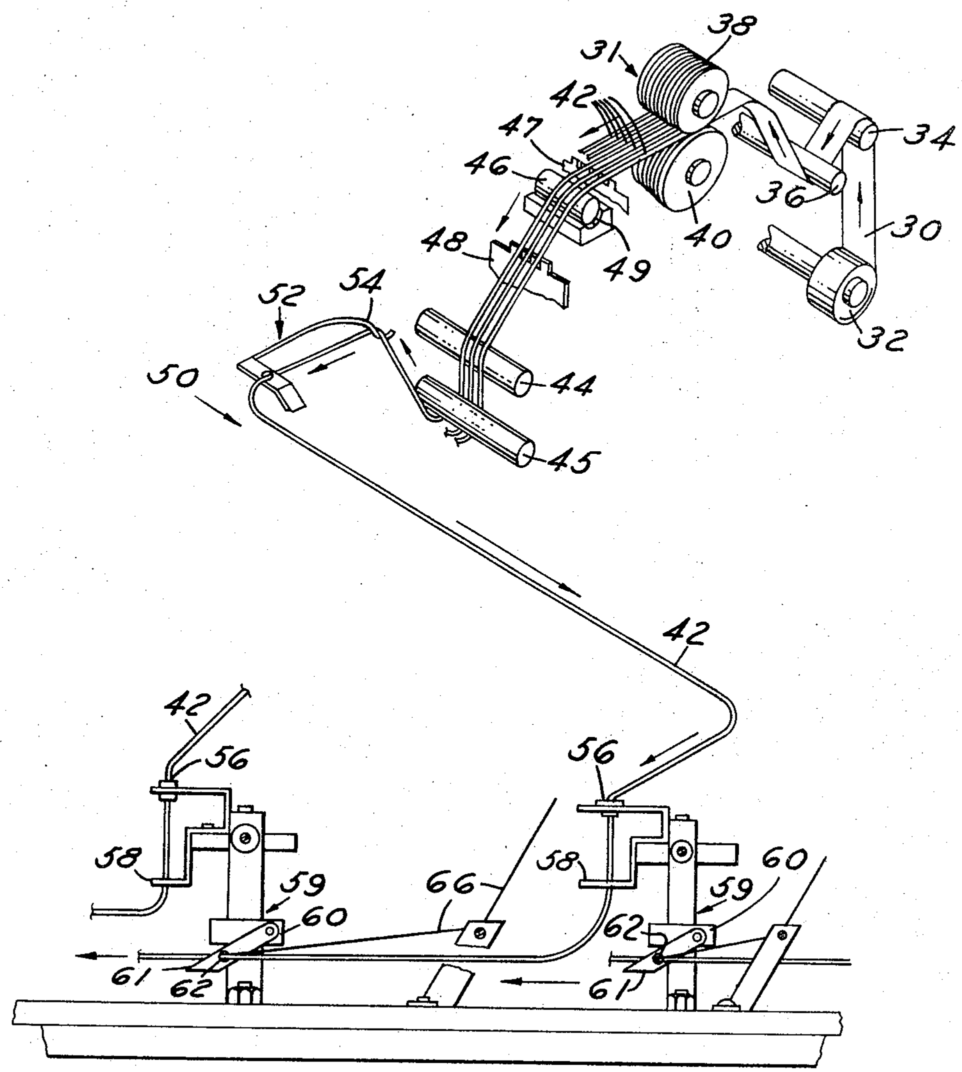
PETER P.A. BURNETT
PAUL D. O'KRAY
JAMES W. PATTERSON
INVENTORS
BY John R. Faulkner
Glenn S. Arendsen
ATTORNEYS

United States Patent Office 3,568,279
Patented Mar. 9, 1971

3,568,279

PROCESS FOR LUBRICATING POLYMERIC MATERIALS

Peter P. A. Burnett, Birmingham, Paul D. O'Kray, Dearborn, and James W. Patterson, Mount Clemens, Mich., assignors to Ford Motor Company, Dearborn, Mich.

Filed May 22, 1969, Ser. No. 827,005
Int. Cl. D02g 3/36
U.S. Cl. 28—75 5 Claims

ABSTRACT OF THE DISCLOSURE

A lubricant used in manufacturing knitted polyvinyl chloride materials is formed from an aqueous emulsion of a plasticizer for the polyvinyl chloride, such as a dialkyl phthalate in which the alkyl radicals contain 6 to 10 carbon atoms. During subsequent processing the aqueous dispersion medium evaporates and the plasticizer is absorbed into the polyvinyl chloride film. The lubricant reduces process disruptions for equipment cleaning and produces materials having a more uniform color, surface appearance and pliability.

BACKGROUND OF THE INVENTION

Waxy or oily materials traditionally have been used as lubricants for polymeric materials by applying the materials to the polymeric material prior to an operational step requiring lubrication. Part of the lubricant remained on the polymeric material during subsequent processing, however, and caused difficulty especially during processing involving the use of heated rolls. These heated rolls soon became covered with a waxy or oily residue that caused stickiness and uneven heat transfer and in some cases extracted pigmentation from the polymeric material. Other prior art lubricants modified certain characteristics of the polymeric material in a manner interfering with the properties desired in the final product.

SUMMARY OF THE INVENTION

This invention provides a process for lubricating a polymeric material during manufacturing in which an emulsion of a plasticizer for the polymeric material is used as the lubricant. The plasticizer preferably is emulsified in an aqueous dispersion medium and the emulsion is applied to the material prior to a manufacturing operation requiring lubrication. Subsequent operations evaporate the aqueous dispersion medium and adsorb the plasticizer into the polymeric material.

The lubricant is useful particularly in the production of knitted vinyl as described in U.S. patent application Burnett et al. Ser. No. 717,554, filed Apr. 1, 1968, now Pat. No. 3,491,560 issued Jan. 27, 1970, the entire disclosure of which is incorporated herein. An aqueous emulsion containing from 5 to 15 weight percent of a plasticizer for the vinyl such as a dialkyl phthalate is applied to vinyl tapes prior to the knitting operation. The emulsion lubricates the tapes during knitting to smooth movement of materials through the knitting machines. During subsequent operations on the knitted material at room temperature or in an oven, the aqueous dispersion medium evaporates and the plasticizer is absorbed into the knitted vinyl. By the time the knitted vinyl reaches the heated embossing rolls, virtually none of the lubricant is left on the surface. The small amounts of plasticizer in the lubricant do not change significantly the properties of the knitted vinyl as a result of the plasticizer adsorption; larger amounts of plasticizer in the lubricant can be used to modify the properties of the knitted vinyl product if desired.

Small amounts of emulsifying agents such as sorbitan monooleate can be used in the emulsion if desired. A dialkyl phthalate in which the alkyl radicals are a mixture of 6 to 10 carbon atoms (known commonly as 6–10 alfol phthalate) is preferred as the plasticizer because it produces a stable emulsion and is highly compatible with the polyvinyl chloride. Other plasticizers for the polyvinyl chloride such as diisodecyl phthalate, butyl benzyl phthalate, diisodecyl azelate, epoxidized actyl tallate, or polymeric plasticizers also can be used.

BRIEF DESCRIPTION OF THE DRAWING

The drawing is a schematic layout of the slitting, lubricating, and knitting operations carried out in producing knitted vinyl. The lubricating emulsion of a plasticizer is applied to the narrow vinyl tapes after slitting and prior to knitting.

DETAILED DESCRIPTION

A dialkyl phthalate plasticizer is produced by esterifying a mixture of n-hexanol, n-octanol, and n-decanol with phthalic acid or anhydride. The alkyl radicals of the resulting ester contain 6–10 carbon atoms and the ester is sold commercialy as 6–10 alfol phthalate. About 10 weight parts of the plasticizer are mixed with 0.4 weight part of sorbitan monooleate and 2.4 weight parts of polysorbate. The monooleate and polysorbate are emulsifying agents compatible with the polyvinyl chloride and can be obtained from Atlas Chemical Company as Span 80 and Tween 80.

Water, which serves as the dispersion medium, is added slowly to the mixture of plasticizer and emulsifying agents while agitating the ingredients at high speed to emulsify the plasticizer. About 87.2 parts water are added to produce 100 weight parts of a lubricant ready for use. Alternatively, a master batch formulation can be prepared by mixing 50 weight parts of the phthalate plasticizer with 2 weight parts sorbitan monooleate, 12.2 weight parts of polysorbate, and 35.8 weight parts water. The master batch is diluted with water just prior to use in a 4 to 1 ratio to yield the same specific formulation.

Referring to the drawings, a roll 32 of polyvinyl chloride film 30 having a width of about 5 inches is mounted in the slitting mechanism indicated in the drawings by numeral 31. In the slitting mechanism, a set of drive rolls 34 and 36 unwind the film from roll 32 and direct the film between an upper arbor 38 and the lower arbor 40 that slit the film into a plurality of thin tapes 42. A second set of drive rolls 44 and 45 draw the tapes across a lubricating roll 46 positioned between two guide combs 47 and 48. Lubricating roll 46 has its lower portion immersed in an open tank 49 containing the plasticizer emulsion. Roll 46 rotates to apply a small amount of the lubricant to each portion of tapes 42. Rolls 44 and 45 direct the tapes to the circular knitting machine indicated in the drawing by numeral 50.

Each tape entering the knitting machine 50 passes through a stop motion device indicated generally by numeral 52. Stop motion device 52 comprises a spring member 54 tensioned into an unstable position by the tension existing in tape 42. If tape 42 should break, the tension holding spring member 54 is released and the spring member returns to a neutral position thereby tripping a switch (not shown) that shuts down the slitting and knitting machines. The tape then passes through appropriate guides 56 and 58 and is directed through a folding mechanism 59.

Folding mechanism 59 comprises a plate 60 having a spring steel arm 61 attached thereto. Arm 61 projects downward in the direction of movement of the tapes and has a hole 62 formed in its lower end. Hole 62 has a diameter equal to or slightly smaller than the tape width and as the tape passes through hole 62, the tape edges are folded toward each other. If desired a nylon reinforcing yarn 66 can be directed to one side of the tape just prior to the point where the tape enters hole 62 and the folding action folds the tape around the yarn 66. The folded (and reinforced) tapes are then knitted on the circular knitting machine.

Lubricant applied to tapes 42 by roll 46 assists the tapes in traversing stop motion device 52, guides 56 and 58, folding mechanism 59, and the subsequent knitting operation without sticking. The lubricant reduces the dynamic coefficient of friction between the tapes and the equipment by amounts up to and exceeding 40 percent and permits the tapes to move smoothly through the equipment.

The knitted vinyl from knitting machine 50 generally is transported into an oven operated at about 275° F. In this oven, the aqueous dispersion medium of the emulsion evaporates and the plasticizer is absorbed into the vinyl film. Some of the emulsifying agents also can be absorbed into the vinyl film and the remainder is driven off in the oven. In some cases, a negligible amount of the emulsifying agents might remain on the surface of the knitted vinyl. Subsequently, the knitted vinyl passes through a pressing operation and an embossing operation, both of which use heated rolls. Since virtually all of the lubricant has disappeared from the surface of the knitted material, no difficulties are experienced at these heated rolls.

Emulsions containing about 5 weight percent of the plasticizer do not modify significantly the properties of the knitted vinyl after absorption but perform an excellent job of lubricating the film during processing. Larger concentrations are used where a softer hand is desired. Good results have been obtained in knitted vinyl production with aqueous dispersions of 6–10 alfol phthalate, diisodecyl phthalate, or diisodecyl azelate plasticizers.

Other polymeric materials can use emulsions of plasticizers therefor as lubricants in the same manner. Emulsifiable plasticizers can be selected for use as lubricants according to the properties desired in the final product. For example, diisodecyl azelate preferably is used in emulsified form as a lubricant for materials that require stringent low temperature flexibility. The lubricant can be applied to polymeric sheet, film, fiber, yarn or other forms. Other dispersion mediums compatible with the material being lubricated and producing emulsions having lubricating value can be used in place of water. Water emulsions are easily prepared, present no health hazards, do an excellent job of lubricating, and are preferred.

Thus this invention provides a process for lubricating polymeric materials during production without interfering with other production operations. The process results in cleaner equipment requiring less maintenance and improved products having more uniform appearance and properties. In addition, the process can be used to modify the pliability of the product.

What is claimed is:

1. A process for lubricating a polymeric material during manufacturing comprising preparing an emulsion by dispersing a plasticizer for the polymeric material in a dispersion medium, said emulsion consisting essentally of said plasticizer and said dispersion medium, applying said emulsion to the material prior to a manufacturing operation requiring lubrication, said emulsion serving said material as a lubricant during said manufacturing operation, and evaporating substantially all of the dispersion medium and absorbing substantially all of the plasticizer into the polymeric material after said manufacturing operation.

2. The process of claim 1 in which the polymeric material is polyvinyl chloride and the emulsion comprises an aqueous dispersion medium containing 6–10 alfol phthalate, diisodecyl phthalate, or diisodecyl azelate as the plasticizer.

3. The process of claim 2 in which the amount of plasticizer in the emulsion is about 5–15 weight percent.

4. A process for producing knitted polyvinyl chloride comprising producing a polyvinyl chloride film, slitting the film longitudinally into narrow tapes, applying to said tapes an emulsion consisting essentially of a plasticizer for the polyvinyl chloride in a dispersion medium, knitting the tapes into a knitted sheet material, evaporating substantially all of the dispersion medium of the emulsion and absorbing substantially all of the plasticizer into the polyvinyl chloride, and exposing the knitted sheet material to further processing including contacting the sheet material with heated rolls.

5. The process of claim 4 in which the emulsion is made by agitation of a plasticizer with an aqueous dispersion medium.

References Cited

UNITED STATES PATENTS

| | | | |
|---|---|---|---|
| 2,666,038 | 1/1954 | Eisen | 260—23 |
| 2,838,455 | 6/1958 | Tompkins | 117—139.5FX |
| 3,201,362 | 8/1965 | Mark | 260—28.5 |
| 3,331,222 | 7/1967 | Marks | 66—125X |
| 3,446,041 | 5/1969 | Marks et al. | 66—125 |
| 3,491,560 | 1/1970 | Burnett et al. | 66—202 |

MERVIN STEIN, Primary Examiner

U.S. Cl. X.R.

57—165; 66—125; 117—139.5